(12) United States Patent
Kashiwadate et al.

(10) Patent No.: US 11,692,499 B2
(45) Date of Patent: Jul. 4, 2023

(54) INTAKE AND EXHAUST SYSTEM (71) Applicant: SUBARU CORPORATION, Tokyo (JP)

(72) Inventors: Tomonori Kashiwadate, Tokyo (JP); Susumu Shimura, Tokyo (JP); Seita Nakano, Tokyo (JP); Sotaro Yoshii, Tokyo (JP); Kenta Hoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/950,658

(22) Filed: Sep. 22, 2022

(65) Prior Publication Data
US 2023/0103749 A1 Apr. 6, 2023

(30) Foreign Application Priority Data

Oct. 1, 2021 (JP) .................. 2021-162525

(51) Int. Cl.
F02D 41/00 (2006.01)
F02D 41/24 (2006.01)
F02M 26/22 (2016.01)

(52) U.S. Cl.
CPC ..... F02D 41/0077 (2013.01); F02D 41/0065 (2013.01); F02D 41/2451 (2013.01); F02M 26/22 (2016.02)

(58) Field of Classification Search
CPC ............. F02D 41/0077; F02D 41/0065; F02D 41/2451; F02M 26/22
See application file for complete search history.

(56) References Cited

U.S. PATENT DOCUMENTS

| 2012/0097139 | A1 | 4/2012 | Takezoe | |
|---|---|---|---|---|
| 2015/0013651 | A1* | 1/2015 | Hayman | F02M 26/43 123/568.11 |
| 2017/0335777 | A1* | 11/2017 | Yamaguchi | F02D 9/02 |
| 2018/0245528 | A1* | 8/2018 | Kobara | F02D 41/0007 |
| 2021/0148298 | A1* | 5/2021 | Oh | F02M 26/21 |

FOREIGN PATENT DOCUMENTS

JP 5387914 B2 1/2014

* cited by examiner

Primary Examiner — Xiao En Mo
(74) Attorney, Agent, or Firm — McGinn I.P. Law Group, PLLC (57) ABSTRACT An intake and exhaust system includes an engine, an intake air channel, an exhaust gas channel, an EGR channel, an EGR valve, and a control device. By adjusting an opening degree of the EGR valve, the control device executes EGR control processing to control a flowrate of a recirculating exhaust gas. An isolation valve is disposed in the EGR channel closer to the exhaust gas channel than the EGR valve is. An air admittance valve is disposed in the EGR channel closer to the exhaust gas channel than the EGR valve is and closer to the intake air channel than the isolation valve is. The control device executes learning processing to learn a relationship between an actual flowrate and a reference flowrate while the isolation valve is closed and the air admittance valve is opened. The control device executes the EGR control processing based on a learning processing result.

12 Claims, 9 Drawing Sheets

INTAKE AND EXHAUST SYSTEM

CROSS-REFERENCE TO RELATED APPLICATIONS

The present application claims priority from Japanese Patent Application No. 2021-162525 filed on Oct. 1, 2021, the entire contents of which are hereby incorporated by reference.

BACKGROUND

The disclosure relates to an intake and exhaust system. As an intake and exhaust system for an engine, a system that can perform exhaust gas recirculation (EGR), such as that disclosed in Japanese Patent No. 5387914, is available. In such an intake and exhaust system, an EGR channel that couples an exhaust gas channel and an intake air channel to each other is provided. In EGR, part of an exhaust gas flowing through the exhaust gas channel recirculates back to the intake air channel via the EGR channel, thereby lowering the combustion temperature in the engine. This makes it less likely to produce nitrogen oxides (NOx) and accordingly reduces NOx emissions. The fuel efficiency can also be improved.

SUMMARY

An aspect of the disclosure provides an intake and exhaust system including an engine, an intake air channel, an exhaust gas channel, an exhaust gas recirculation channel, an exhaust gas recirculation valve, and a control device. The intake air channel is coupled to the engine. The exhaust gas channel is coupled to the engine. The exhaust gas recirculation channel couples the exhaust gas channel and the intake air channel to each other. The exhaust gas recirculation valve is disposed in the exhaust gas recirculation channel. The control device is configured to execute exhaust gas recirculation control processing by adjusting an opening degree of the exhaust gas recirculation valve. The exhaust gas recirculation control processing is processing to control a flowrate of an exhaust gas which is to recirculate back to the intake air channel from the exhaust gas channel via the exhaust gas recirculation channel. At least one isolation valve is disposed in the exhaust gas recirculation channel at a position closer to the exhaust gas channel than the exhaust gas recirculation valve is. At least one air admittance valve is disposed in the exhaust gas recirculation channel at a position closer to the exhaust gas channel than the exhaust gas recirculation valve is and closer to the intake air channel than the at least one isolation valve is. The control device is configured to execute learning processing to learn a relationship between an actual flowrate and a reference flowrate. The actual flowrate is a flowrate of air which is to actually pass through the exhaust gas recirculation valve in a state in which the at least one isolation valve is closed and the at least one air admittance valve is opened. The reference flowrate is a reference value of a flowrate of air which is to pass through the exhaust gas recirculation valve in the state. The control device is configured to execute the exhaust gas recirculation control processing based on a result of the learning processing.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

An EGR valve is disposed in an EGR channel. Adjusting the opening degree of the EGR valve can control the flowrate of an EGR gas which recirculates back to an intake air channel from an exhaust gas channel via the EGR channel. If deposit, such as soot, is attached to the EGR valve, the cross-sectional area of the EGR channel at a position at which the EGR valve is disposed may be decreased, and the flowrate of the EGR gas which recirculates back to the intake air channel may become smaller than an expected flowrate. This may lead to a poor fuel efficiency, a NOx emission increase, and degradation of the knocking preventing performance, for example. It is thus desirable to control the flowrate of the EGR gas appropriately even with the presence of deposit, such as soot, attached to the EGR valve.

It is desirable to provide an intake and exhaust system that is able to appropriately control the flowrate of an EGR gas which recirculates back to an intake air channel.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. [First Embodiment]

An intake and exhaust system 1 according to a first embodiment of the disclosure will be described below with reference to FIGS. 1 through 6.

(Configuration)

The configuration of the intake and exhaust system 1 will be explained below with reference to FIGS. 1 and 2.

Figure 1:
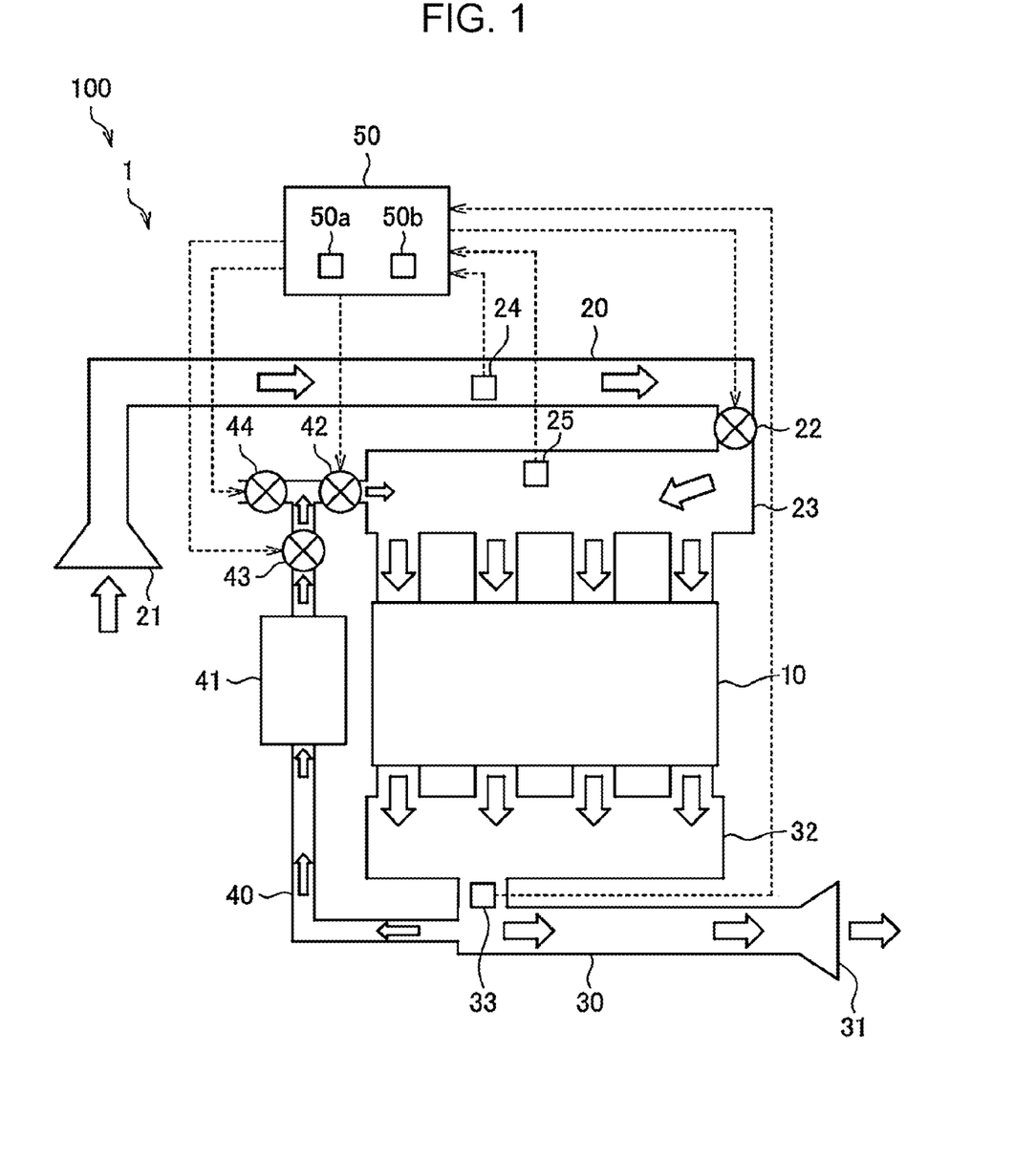
FIG. 1 is a schematic view illustrating the overall configuration of an intake and exhaust system according to an embodiment of the disclosure.

FIG. 1 is a schematic view illustrating the overall configuration of the intake and exhaust system 1. The intake and exhaust system 1 is installed in a vehicle 100. As illustrated in FIG. 1, the intake and exhaust system 1 includes an engine 10, an intake air channel 20, an exhaust gas channel 30, an EGR channel 40, and a control device 50.

The engine 10 is a spark-ignition internal combustion engine, for example. The engine 10 includes multiple cylinders. Within each cylinder, a piston is slidably disposed and forms a combustion chamber. A fuel injector is disposed in each cylinder to inject a fuel to the combustion chamber. In the combustion chamber, an air-fuel mixture is generated and the combustion of the air-fuel mixture occurs due to the ignition of an ignition plug disposed to face the combustion chamber. Because of the combustion of the air-fuel mixture, the piston reciprocates to transmit power to a crankshaft coupled to the piston of each cylinder.

Each combustion chamber of the engine 10 communicates with the intake air channel 20 via an intake port and also communicates with the exhaust gas channel 30 via an exhaust port. In each cylinder, an intake valve that can open and close the intake port and an exhaust valve that can open and close the exhaust port are disposed. Driving the intake valve can supply intake air to the combustion chamber, while driving the exhaust valve can allow an exhaust gas to escape from the combustion chamber.

The intake air channel 20 is coupled to the engine 10. Intake air to be supplied to the combustion chambers of the engine 10 flows through the intake air channel 20. An intake inlet 21 is disposed at the upstream end of the intake air channel 20 to draw air from the outside of the vehicle 100. A throttle valve 22 is disposed on the farther downstream side of the intake air channel 20 than the intake inlet 21. The throttle valve 22 adjusts the flowrate of intake air to be supplied to the engine 10. The flowrate of intake air to be supplied to the engine 10 is varied in accordance with the opening degree of the throttle valve 22. An intake manifold 23 is disposed on the farther downstream side of the intake air channel 20 than the throttle valve 22. The intake manifold 23 branches off toward the cylinders of the engine 10 and the branching portions of the intake manifold 23 are coupled to the intake ports of the individual cylinders. As indicated by the white arrows in FIG. 1, air having entered the intake air channel 20 via the intake inlet 21 sequentially passes through the throttle valve 22 and the intake manifold 23 and is supplied to the engine 10.

In the intake air channel 20, an air flow meter 24 and an intake pressure sensor 25 are disposed. The air flow meter 24 is located on the farther upstream side of the intake air channel 20 than the throttle valve 22. The air flow meter 24 detects the flowrate of air drawn into the intake air channel 20 via the intake inlet 21. The intake pressure sensor 25 is disposed in the intake manifold 23 to detect the intake pressure, which is the pressure of intake air, in the intake manifold 23.

The exhaust gas channel 30 is coupled to the engine 10. A gas exhausted from the combustion chambers of the engine 10 flows through the exhaust gas channel 30. An exhaust outlet 31 is disposed at the downstream end of the exhaust gas channel 30 to allow the exhaust gas to escape from the vehicle 100 to the outside. In the exhaust gas channel 30, an exhaust manifold 32 is disposed. The exhaust manifold 32 branches off toward the cylinders of the engine 10 and the branching portions are coupled to the exhaust ports of the individual cylinders. As indicated by the white arrows in FIG. 1, a gas exhausted from the engine 10 passes through the exhaust manifold 32 and is discharged from the exhaust outlet 31.

An air-fuel ratio sensor 33 is disposed in the exhaust gas channel 30. For example, the air-fuel ratio sensor 33 is provided on the farther downstream side of the exhaust gas channel 30 than the exhaust manifold 32. The air-fuel ratio sensor 33 detects the air-fuel ratio of the exhaust gas flowing in the exhaust gas channel 30.

The EGR channel 40 couples the exhaust gas channel 30 and the intake air channel 20 to each other. As indicated by the white arrows in FIG. 1, part of the exhaust gas flowing through the exhaust gas channel 30 flows into the EGR channel 40. The exhaust gas flowing into the EGR channel 40 passes through the EGR channel 40 and recirculates back to the intake air channel 20. The technology of allowing part of the exhaust gas to recirculate back to the intake air channel 20 in this manner is called EGR. EGR can lower the combustion temperature in the engine 10, make it less likely to produce NOx, and thus reduce NOx emissions. EGR also improves the fuel efficiency. Hereinafter, a gas flowing through the EGR channel 40 will also be called an EGR gas. As seen from the EGR channel 40, the exhaust gas channel 30 is located on the upstream side, while the intake air channel 20 is located on the downstream side.

In the example in FIG. 1, the upstream end of the EGR channel 40 is coupled to a portion of the exhaust gas channel 30 on the farther downstream side than the exhaust manifold 32. Nevertheless, the upstream end of the EGR channel 40 may be coupled to the exhaust manifold 32. In the example in FIG. 1, the downstream end of the EGR channel 40 is coupled to the intake manifold 23. Nevertheless, the downstream end of the EGR channel 40 may be coupled to a portion of the intake air channel 20 on the farther upstream side than the intake manifold 23 and on the farther downstream side of the throttle valve 22.

An EGR cooler 41 is disposed in the EGR channel 40. The EGR gas flowing through the inside of the EGR cooler 41 is subjected to heat exchange with air outside the EGR cooler 41 so as to be cooled. An EGR valve 42 is disposed in the EGR channel 40 at a position closer to the intake air channel 20 than the EGR cooler 41 is. The EGR valve 42 adjusts the flowrate of the EGR gas which recirculates back to the intake air channel 20 from the exhaust gas channel 30 via the EGR channel 40. The flowrate of the EGR gas which recirculates back to the intake air channel 20 is the flowrate of the EGR gas flowing through the EGR channel 40. Hereinafter, the flowrate of the EGR gas which recirculates back to the intake air channel 20 may also be simply called the flowrate of the EGR gas. Adjusting the opening degree of the EGR valve 42 can control the flowrate of the EGR gas.

In the intake and exhaust system 1, an isolation valve 43 and an air admittance valve 44 are disposed in the EGR channel 40. In one example, the isolation valve 43 may serve as an example of a first isolation valve according to an embodiment of the disclosure. In one example, the air admittance valve 44 may serve as an example of a first air admittance valve according to an embodiment of the disclosure.

In the EGR channel 40, the isolation valve 43 is disposed closer to the exhaust gas channel 30 than the EGR valve 42 is and closer to the intake air channel 20 than the EGR cooler 41 is. The isolation valve 43 can open and close the exhaust gas channel 30. When the isolation valve 43 is opened, the EGR gas coming from the exhaust gas channel 30 can pass through the isolation valve 43. When the isolation valve 43 is closed, the EGR gas coming from the exhaust gas channel 30 is unable to pass through the isolation valve 43.

In the EGR channel 40, the air admittance valve 44 is disposed closer to the exhaust gas channel 30 than the EGR valve 42 is and closer to the intake air channel 20 than the isolation valve 43 is. The air admittance valve 44 allows air to enter the EGR channel 40. For example, the air admittance valve 44 can open and close a branching channel which branches off from a portion of the EGR channel 40 closer to the intake air channel 20 than the EGR cooler 41 is and which opens to the atmosphere. When the air admittance valve 44 is opened, air outside the EGR channel 40 can pass through the air admittance valve 44 and enter the EGR channel 40 via the air admittance valve 44. When the air admittance valve 44 is closed, air outside the EGR channel 40 is unable to pass through the air admittance valve 44 and does not enter the EGR channel 40 via the air admittance valve 44.

The control device 50 includes one or more processors 50a and one or more memories 50b. The embodiments will be discussed, assuming that the control device 50 includes a single processor 50a and a single memory 50b. The memory 50b is coupled to the processor 50a. The processor 50a includes a central processing unit (CPU), for example. The memory 50b includes a read only memory (ROM) and a random access memory (RAM), for example. The ROM is a storage element that stores a program and operation parameters, for example, used by the CPU. The RAM is a storage element that temporarily stores variables and data such as parameters used by the CPU to execute processing.

The control device 50 communicates with the individual devices provided in the intake and exhaust system 1. For example, the control device 50 communicates with the throttle valve 22, the air flow meter 24, the intake pressure sensor 25, the air-fuel ratio sensor 33, the EGR valve 42, the isolation valve 43, and the air admittance valve 44. A communication network, such as a controller area network (CAN), may be used for communication between the control device 50 and the individual devices of the intake and exhaust system 1.

Figure 2:
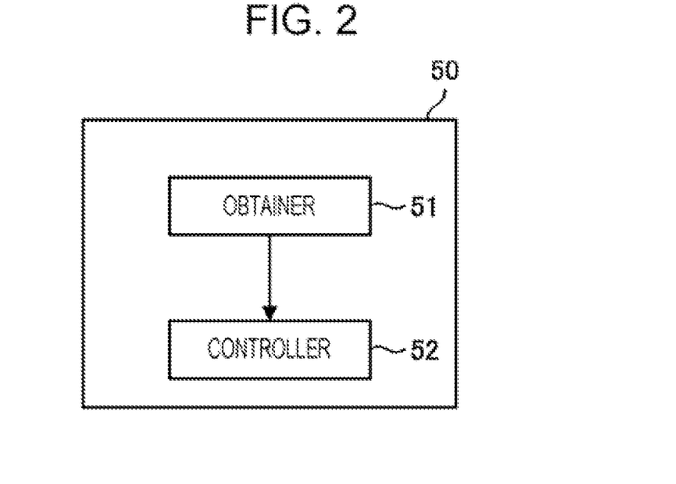
FIG. 2 is a block diagram illustrating an example of the functional configuration of a control device according to the embodiment.

FIG. 2 is a block diagram illustrating an example of the functional configuration of the control device 50. As illustrated in FIG. 2, the control device 50 includes an obtainer 51 and a controller 52. Various processing operations including operations performed by the obtainer 51 and the controller 52, which will be discussed later, can be executed by the processor 50a. In one example, various processing operations are executed as a result of the processor 50a executing a program stored in the memory 50b.

The obtainer 51 obtains various items of information to be used for processing executed by the controller 52 and outputs the obtained items of information to the controller 52. The obtainer 51 obtains information from the air flow meter 24, the intake pressure sensor 25, and the air-fuel ratio sensor 33, for example.

The controller 52 controls the operations of the individual devices of the intake and exhaust system 1. In one example, the controller 52 controls the operations of the throttle valve 22, the EGR valve 42, the isolation valve 43, and the air admittance valve 44 so as to control a gas flow in the intake and exhaust system 1.

The functions of the control device 50 according to the first embodiment may be implemented by one device or multiple devices. If the functions are implemented by multiple devices, these devices may be coupled with each other via a communication bus of a CAN, for example.

(Operation)

The operation of the intake and exhaust system 1 will be described below with reference to FIGS. 3 through 6.

In the first embodiment, the control device 50 executes EGR control processing by adjusting the opening degree of the EGR valve 42. The EGR control processing is processing to control the flowrate of the EGR gas which recirculates back to the intake air channel 20 from the exhaust gas channel 30 via the EGR channel 40. Deposit, such as soot, attached to the EGR valve 42 may decrease the cross-sectional area of the EGR channel 40 at the position at which the EGR valve 42 is disposed and thus reduce the flowrate of the EGR gas. This may lead to a poor fuel efficiency, a NOx emission increase, and degradation of the knocking preventing performance, for example.

In the first embodiment, to suitably control the flowrate of the EGR gas, the control device 50 executes learning processing, which will be discussed later, and then executes EGR control processing based on the learning processing results. A procedure of EGR control processing will first be discussed below, and then, a procedure of learning processing will be discussed.

Figure 3:
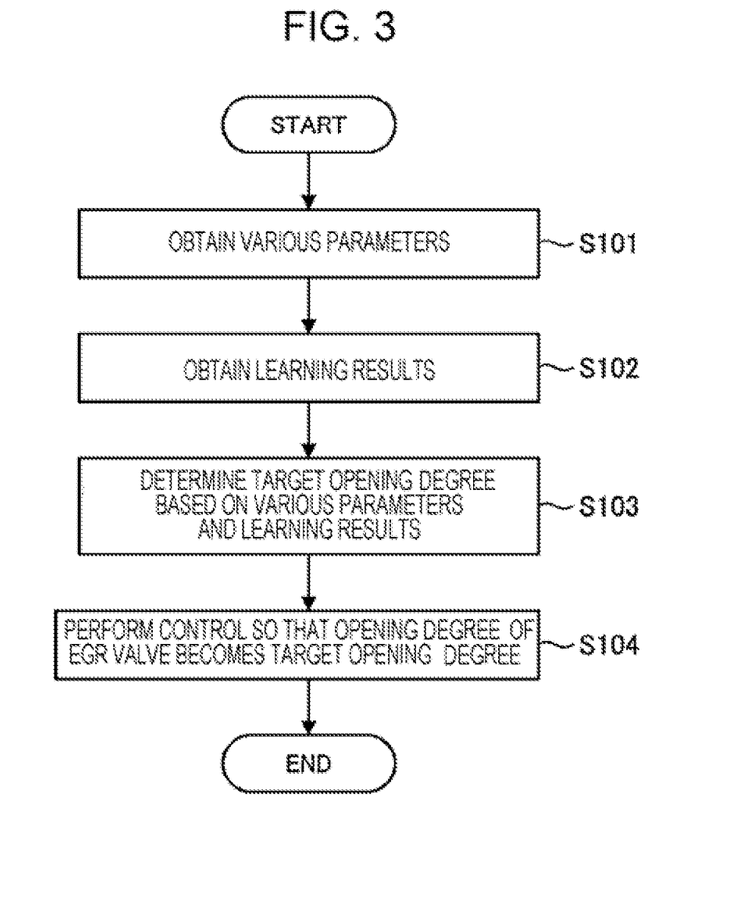
FIG. 3 is a flowchart illustrating an example of a procedure of EGR control processing executed by the control device in the embodiment.

FIG. 3 is a flowchart illustrating an example of the procedure of EGR control processing executed by the control device 50 in the first embodiment. The EGR control processing illustrated in FIG. 3 is repeatedly executed with learning processing illustrated in FIG. 4 in parallel or sequentially, for example.

In the EGR control processing in FIG. 3, in step S101, the obtainer 51 obtains various parameters to be used for determining a target opening degree of the EGR valve 42. Examples of the parameters are the load and the speed of the engine 10, the temperature of intake air, and the flowrate of intake air drawn to the intake air channel 20 via the intake inlet 21. For example, sensors are provided in the vehicle 100 to detect these parameters, and the obtainer 51 can obtain these parameters from the individual sensors.

In step S102, the obtainer 51 obtains results of the learning processing, which will be discussed later. In the learning processing, the relationship between an actual flowrate and a reference flowrate is learned. The actual flowrate is a flowrate of air which actually passes through the EGR valve 42. The reference flowrate is the reference value of a flowrate of air which is supposed to pass through the EGR valve 42. That is, the reference flowrate is the expected value of the flowrate of air which passes through the EGR valve 42 in a state in which no deposit, such as soot, is attached to the EGR valve 42. Hereinafter, the flowrate of air which actually passes through the EGR valve 42 may simply be called the actual flowrate, while the reference value of the flowrate of air which is supposed to pass through the EGR valve 42 may simply be called the reference flowrate. The results of learning processing are stored in the memory 50b of the control device 50, for example.

Then, in step S103, the controller 52 determines the target opening degree of the EGR valve 42, based on the parameters obtained in step S101 and the learning results obtained in step S102.

In step S103, the controller 52 determines the target opening degree so as to obtain the flowrate of the EGR gas at which a lower combustion temperature in the engine 10, reduced NOx emissions, and improved fuel efficiency can be appropriately implemented as a result of executing EGR control. For instance, the controller 52 first determines the reference value of the target opening degree of the EGR valve 42 based on the parameters obtained in step S101, and then determines the final target opening degree by adjusting the reference value based on the learning results obtained in step S102. Details of the adjustment of the target opening degree by using the learning processing results will be discussed later.

Then, in step S104, the controller 52 performs control so that the opening degree of the EGR valve 42 becomes the target opening degree determined in step S103. The EGR control processing in FIG. 3 is then completed.

Figure 4:
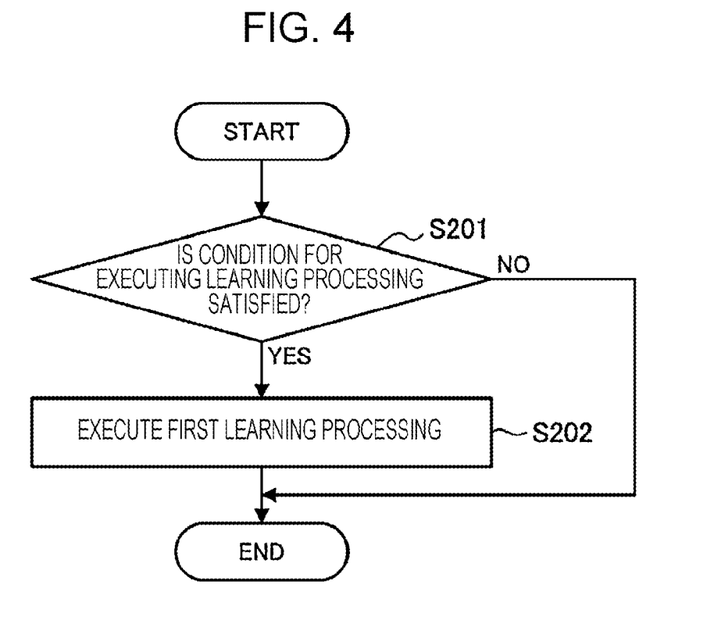
FIG. 4 is a flowchart illustrating an example of a procedure of learning processing executed by the control device in the embodiment.

FIG. 4 is a flowchart illustrating an example of a procedure of learning processing executed by the control device 50. Learning processing illustrated in FIG. 4 is repeatedly executed with EGR control processing illustrated in FIG. 3 in parallel or sequentially, for example.

In learning processing in FIG. 4, in step S201, the controller 52 first determines whether a condition for executing learning processing is satisfied.

In learning processing, the degree by which the flowrate of air passing through the EGR valve 42 is changed due to deposit, such as soot, attached to the EGR valve 42 is learned. For example, the condition for executing learning processing may be a condition that a certain amount of deposit, such as soot, is attached to the EGR valve 42. If such an execution condition is used to determine the timing of learning processing, learning processing can be executed effectively. In one example, if the driving distance of the vehicle 100 exceeds a preset distance, the controller 52 may determine that a certain amount of deposit, such as soot, is attached to the EGR valve 42. In another example, if the cumulative time for which the EGR valve 42 is open exceeds a preset time, the controller 52 may determine that a certain amount of deposit, such as soot, is attached to the EGR valve 42.

As discussed below, during learning processing, the amount of air supplied to the engine 10 is varied, which may change the fuel injection amount. This makes it likely to vary output from the engine 10. It may thus be desirable to execute learning processing when the vehicle 100 is driving in a steady state and the operating state of the engine 10 is stable. This can improve the accuracy of learning processing. Hence, the condition for executing learning processing may be a condition that the vehicle 100 is driving in a steady state. Steady driving means that the vehicle 100 is running with stable driving conditions. If such an execution condition is used to determine the timing of learning processing, learning processing can be executed when the behavior of the vehicle 100 is unlikely to become unstable even if output from the engine 10 is changed. In one example, when the speed of the engine 10 is stable and does not change considerably over a preset time, the controller 52 may determine that the vehicle 100 is driving in a steady state.

If the vehicle 100 has another drive source such as a drive motor in addition to the engine 10, it may drive in a hybrid electric vehicle (HEV) mode using both of output from the engine 10 and output from the drive motor. In this case, the condition for executing learning processing may be a condition that the HEV mode is being executed. If learning processing is executed during the HEV mode, the controller 52 can control output from the drive motor to compensate for a change in output from the engine 10 caused by the execution of learning processing, thereby making it less likely to vary a driving force applied to the vehicle 100. The behavior of the vehicle 100 is thus less likely to become unstable caused by the execution of learning processing.

Examples of the condition for executing learning processing have been discussed above. However, another condition may be used as the execution condition. Learning processing may be executed when multiple conditions are satisfied. For example, two or more of the above-described three conditions may be used as conditions for executing learning processing.

If the controller 52 determines that the condition for executing learning processing is not satisfied (NO in step S201), learning processing is not executed and the procedure in FIG. 4 is terminated. If the controller 52 determines that the condition for executing learning processing is satisfied (YES in step S201), the process proceeds to step S202. In step S202, the controller 52 executes first learning processing and completes the procedure in FIG. 4.

As described above, in the first embodiment, the control device 50 executes the first learning processing. An example of the procedure of the first learning processing will be discussed below with reference to FIG. 5.

Figure 5:
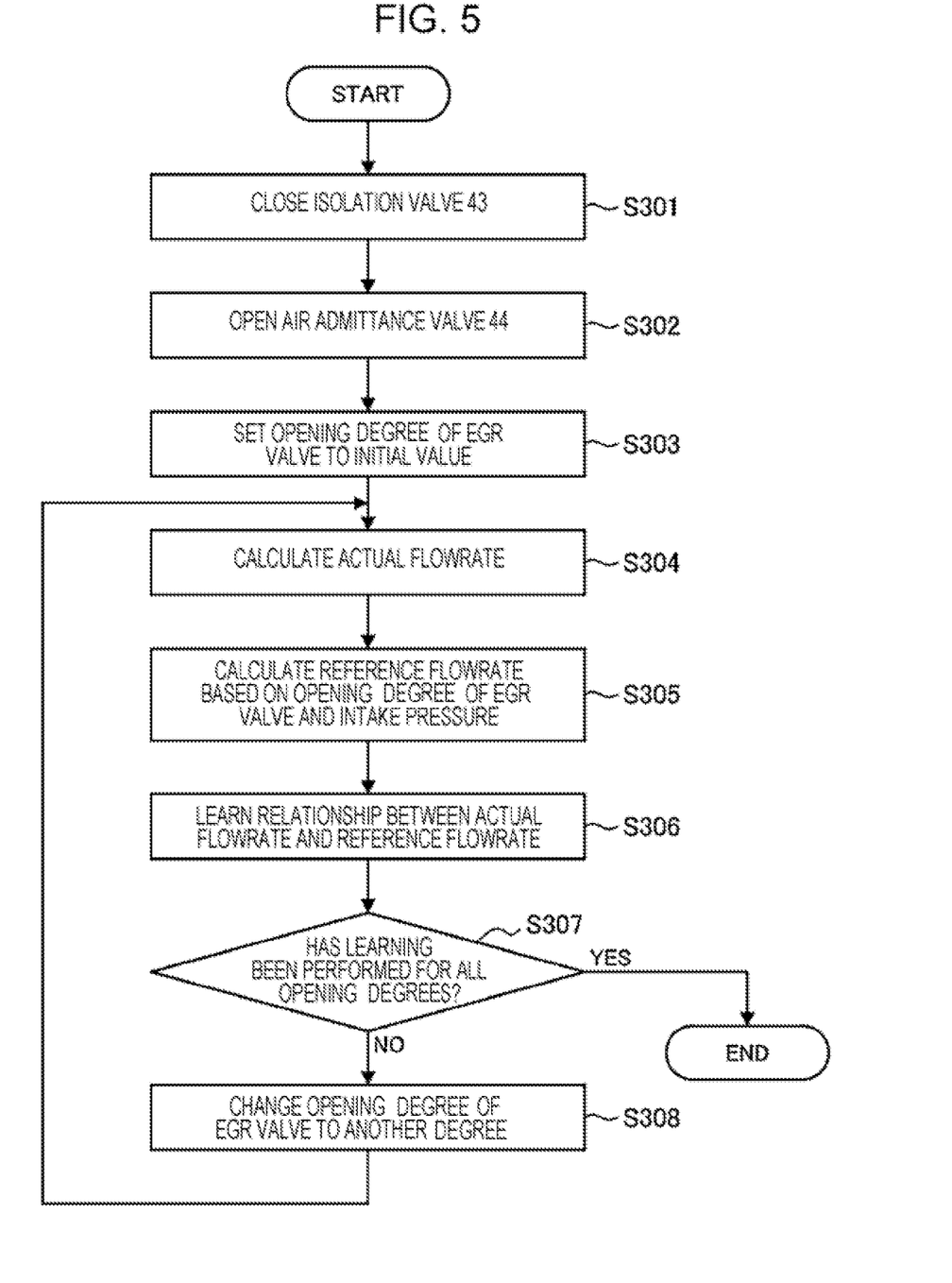
FIG. 5 is a flowchart illustrating an example of a procedure of first learning processing executed by the control device in the embodiment.

FIG. 5 is a flowchart illustrating an example of the procedure of the first learning processing executed by the control device 50 in the first embodiment. The procedure illustrated in FIG. 5 is executed in step S202 in the flowchart of FIG. 4.

In the first learning processing, in step S301, the controller 52 closes the isolation valve 43. This stops the EGR gas coming from the exhaust gas channel 30 from passing through the isolation valve 43.

Then, in step S302, the controller 52 opens the air admittance valve 44. This allows air outside the EGR channel 40 to pass through the air admittance valve 44 and to enter the EGR channel 40 via the air admittance valve 44.

Figure 6:
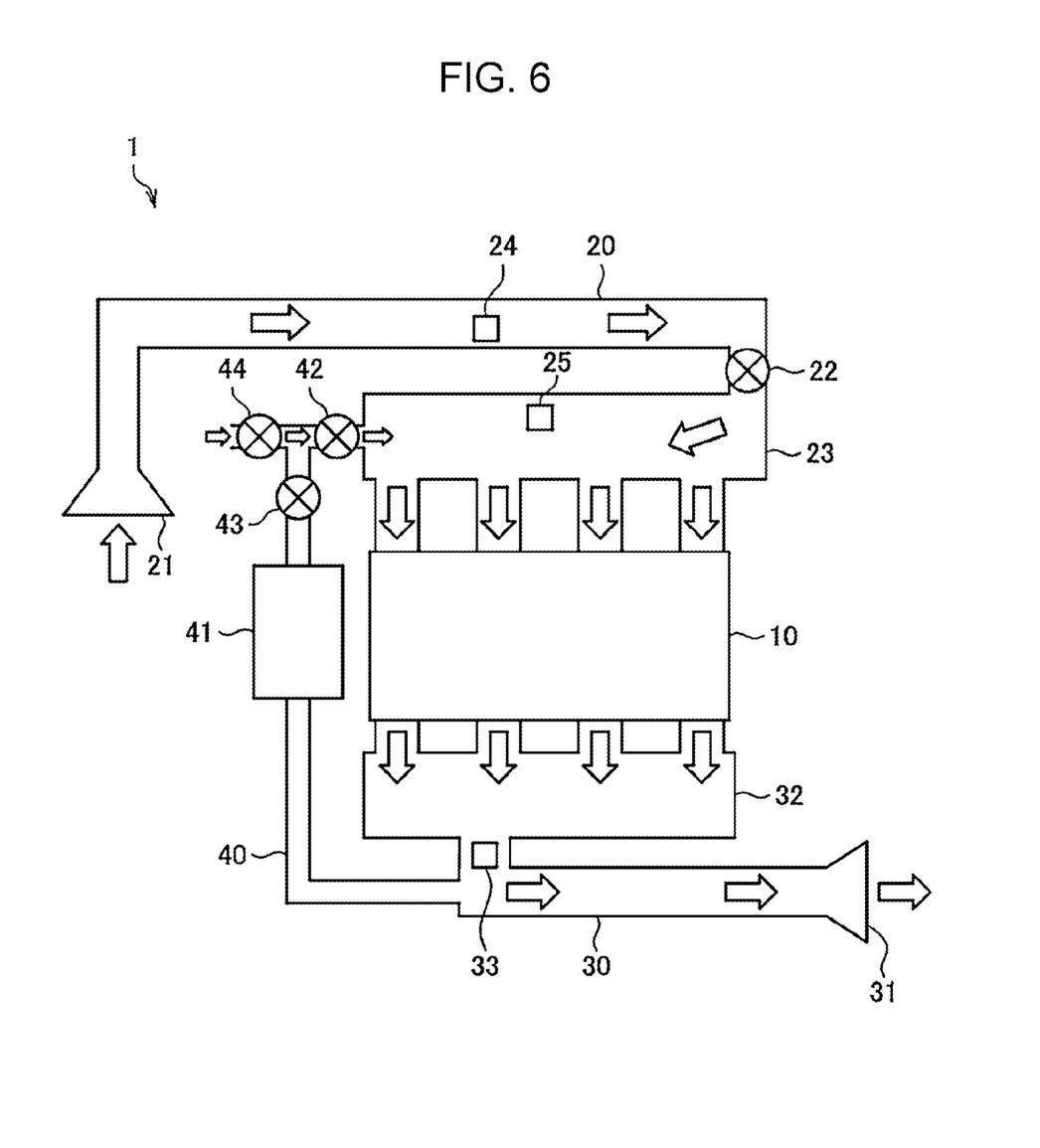
FIG. 6 is a schematic view for explaining a gas flow during first learning processing in the intake and exhaust system according to the embodiment.

FIG. 6 is a schematic view for explaining a gas flow during the first learning processing in the intake and exhaust system 1. As described above, in the first learning processing, the intake and exhaust system 1 enters a first state in which the isolation valve 43 is closed and the air admittance valve 44 is opened. In the first state, air is drawn to the EGR channel 40 via the air admittance valve 44, as indicated by the white arrows in FIG. 6. At this time, the intake manifold 23 is in a negative pressure state. Air having entered the EGR channel 40 via the air admittance valve 44 thus passes through the EGR valve 42 and is supplied to the intake manifold 23.

Referring back to FIG. 5, in step S303, the controller 52 sets the opening degree of the EGR valve 42 to be an initial value.

In the first learning processing, for each of different opening degrees of the EGR valve 42, the control device 50 learns the relationship between the actual flowrate, which is the flowrate of air that actually passes through the EGR valve 42, and the reference flowrate, which is the reference value of air which is supposed to pass through the EGR valve 42. This will be discussed later in detail. The control device 50 first sets the opening degree of the EGR valve 42 to be the initial value and learns the relationship between the actual flowrate and the reference flowrate. The control device 50 then changes the opening degree of the EGR valve 42 and learns the relationship between the actual flowrate and the reference flowrate. In this manner, by repeatedly alternating changing of the opening degree of the EGR valve 42 and learning of the relationship between the actual flowrate and the reference flowrate, the control device 50 performs learning for each of the multiple opening degrees.

Then, in step S304, the controller 52 calculates the actual flowrate of air that actually passes through the EGR valve 42.

For example, the controller 52 can calculate the actual flowrate based on the detection results of the air flow meter 24 and the air-fuel ratio sensor 33 and the fuel injection amount of the engine 10. In one example, the controller 52 can calculate the total flowrate of air supplied to the engine 10 based on the detection result of the air-fuel ratio sensor 33 and the fuel injection amount of the engine 10. The controller 52 then calculates the actual flowrate by subtracting the flowrate of air drawn into the intake air channel 20 via the intake inlet 21 from the total flowrate supplied to the engine 10. The flowrate of air drawn into the intake air channel 20 is obtained based on the detection result of the air flow meter 24.

If the air-fuel ratio is controlled to be maintained at a target value, the fuel injection amount is increased because air is supplied to the engine 10 via the EGR valve 42 in the first learning processing. The controller 52 may calculate the actual flowrate based on an amount by which the fuel injection amount is increased and the detection results of the air flow meter 24 and the air-fuel ratio sensor 33. If a sensor is provided in the intake and exhaust system 1 to detect the actual flowrate or a physical quantity that can be converted to the substantially actual flowrate, the controller 52 may obtain the actual flowrate from this sensor.

Then, in step S305, the controller 52 calculates the reference flowrate, which is the reference value of the flowrate of air passing through the EGR valve 42, based on the opening degree of the EGR valve 42 and the intake pressure. The intake pressure is the pressure of intake air in the intake manifold 23 and can be obtained based on the detection result of the intake pressure sensor 25.

As stated above, the reference flowrate is the expected value of the flowrate of air which is supposed to pass through the EGR valve 42 in a state in which deposit, such as soot, is not attached to the EGR valve 42. As the opening degree of the EGR valve 42 is greater, the cross-sectional area of the EGR channel 40 at the position at which the EGR valve 42 is disposed becomes larger. The flowrate of air passing through the EGR valve 42 is thus increased. Hence, as the opening degree of the EGR valve 42 is greater, the controller 52 calculates the reference flowrate to be a greater value. As the intake pressure is lower, the difference between the pressure on the upstream side and that on the downstream side with respect to the EGR valve 42 becomes larger. The flowrate of air passing through the EGR valve 42 thus becomes greater. Hence, as the intake pressure is lower, the controller 52 calculates the reference flowrate to be a greater value.

Then, in step S306, the controller 52 learns the relationship between the actual flowrate calculated in step S304 and the reference flowrate calculated in step S305. The controller 52 stores the learned relationship between the actual flowrate and the reference flowrate in the memory 50b of the control device 50, for example.

As an example of the relationship between the actual flowrate and the reference flowrate, the ratio of the actual flowrate to the reference flowrate may be used. A factor other than this ratio may be used as the relationship between the actual flowrate and the reference flowrate. For instance, the controller 52 may learn the difference between the actual flowrate and the reference flowrate as the relationship therebetween.

In step S307, the controller 52 determines whether learning has been performed for all the opening degrees of the EGR valve 42. The multiple opening degrees used as samples in the first learning processing may be set at regular intervals or irregularly.

If the controller 52 determines that learning has been performed for all the opening degrees (YES in step S307), the first learning processing in FIG. 5 is completed. If the controller 52 determines that not all the opening degrees are subjected to learning (NO in step S307), the process proceeds to step S308.

In step S308, the controller 52 changes the opening degree of the EGR valve 42 to be an angle for which learning is not yet performed and the process returns to step S304. Then, the controller 52 learns the relationship between the actual flowrate and the reference flowrate with respect to the opening degree set in step S308.

As described above, in learning processing, the control device 50 learns the relationship between the actual flowrate, which is the flowrate of air actually passing through the EGR valve 42, and the reference flowrate, which is the reference value of the flowrate of air passing through the EGR valve 42. The control device 50 can thus learn how much the flowrate of air passing through the EGR valve 42 is changed due to deposit, such as soot, attached to the EGR valve 42. The control device 50 then executes EGR control processing based on the results of learning processing. In EGR control processing, the control device 50 can control the opening degree of the EGR valve 42 by reflecting a decrease in the flowrate of the EGR gas caused by deposit, such as soot, attached to the EGR valve 42.

If the control device 50 controls the opening degree of the EGR valve 42 without reflecting a decrease in the flowrate of the EGR gas caused by deposit, such as soot, attached to the EGR valve 42, the flowrate of the EGR gas is likely to become smaller than a desired flowrate. For example, if the target opening degree of the EGR valve 42 is determined only based on various parameters obtained in step S101 in FIG. 3, the flowrate of the EGR gas becomes smaller than the desired flowrate. This may lead to a poor fuel efficiency, a NOx emission increase, and degradation of the knocking preventing performance, for example.

In contrast, in the first embodiment, the controller 52 determines the target opening degree of the EGR valve 42 based on various parameters obtained in step S101 and the learning results obtained in step S102 in EGR control processing in FIG. 3. For example, the controller 52 divides the reference value of the target opening degree determined based on the parameters obtained in step S101 by the ratio of the actual flowrate to the reference flowrate and sets the resulting opening degree to be the final target opening degree. Hence, the controller 52 can set a wider opening degree of the EGR valve 42 in accordance with a decrease in the flowrate of the EGR gas caused by deposit, such as soot, attached to the EGR valve 42. It is thus possible to obtain the flowrate of the EGR gas at which reduced NOx emissions and improved fuel efficiency can be appropriately implemented.

As discussed above, according to the first embodiment, in EGR control processing, a decrease in the flowrate of the EGR gas caused by deposit, such as soot, attached to the EGR valve 42 can be reflected in determining of the opening degree of the EGR valve 42. The flowrate of the EGR gas can thus be suitably controlled even with the presence of deposit, such as soot, attached to the EGR valve 42. As a result, it is less likely to lower the fuel efficiency, increase NOx emissions, and degrade the knocking preventing performance, for example.

(Advantages)

Advantages of the intake and exhaust system 1 will be described below.

In the intake and exhaust system 1 according to the first embodiment, at least one isolation valve 43 is disposed in the EGR channel 40 at a position closer to the exhaust gas channel 30 than the EGR valve 42 is, and at least one air admittance valve 44 is disposed in the EGR channel 40 at a position closer to the exhaust gas channel 30 than the EGR valve 42 is and closer to the intake air channel 20 than the isolation valve 43 is. The control device 50 executes learning processing to learn the relationship between the actual flowrate, which is the flowrate of air actually passing through the EGR valve 42 in a state in which the isolation valve 43 is closed and the air admittance valve 44 is opened, and the reference flowrate, which is the reference value of the flowrate of air passing through the EGR valve 42 in the same state. The control device 50 then executes EGR control processing based on the results of learning processing. In EGR control processing, the control device 50 can control the opening degree of the EGR valve 42 by reflecting a decrease in the flowrate of the EGR gas caused by deposit, such as soot, attached to the EGR valve 42. The flowrate of the EGR gas can thus be suitably controlled even with the presence of deposit, such as soot, attached to the EGR valve 42. As a result, it is less likely to lower the fuel efficiency, increase NOx emissions, and degrade the knocking preventing performance, for example.

The positions of the isolation valve 43 and the air admittance valve 44 are not limited to those in the above-described example. For instance, the isolation valve 43 may be disposed in the EGR channel 40 at a position closer to the exhaust gas channel 30 than the EGR cooler 41 is, as in an isolation valve 45 illustrated in FIG. 7, which will be discussed later. The air admittance valve 44 may be disposed in the EGR channel 40 at a position closer to the exhaust gas channel 30 than the EGR cooler 41 is and closer to the intake air channel 20 than the isolation valve 45 is, as in an air admittance valve 46 illustrated in FIG. 7, which will be discussed later.

Nonetheless, it may be desirable that the isolation valve 43 be disposed in the EGR channel 40 at a position closer to the exhaust gas channel 30 than the EGR valve 42 is and closer to the intake air channel 20 than the EGR cooler 41 is. It may also be desirable that the air admittance valve 44 be disposed in the EGR channel 40 at a position closer to the exhaust gas channel 30 than the EGR valve 42 is and closer to the intake air channel 20 than the isolation valve 43 is. With this arrangement, in learning processing, the relationship between the actual flowrate, which is the flowrate of air actually passing through the EGR valve 42, and the reference flowrate, which is the reference value of the flowrate of air passing through the EGR valve 42, can be learned with high accuracy. For example, it may be possible to decrease the influence of the state of the EGR cooler 41 on learning processing to learn the relationship between the actual flowrate and the reference flowrate. It is thus possible to highly accurately learn how much the flowrate of the EGR gas passing through the EGR valve 42 is decreased due to deposit, such as soot, attached to the EGR valve 42.

In the intake and exhaust system 1 according to the first embodiment, it may be desirable that, in learning processing, the control device 50 learn the relationship between the actual flowrate and the reference flowrate for each of multiple opening degrees of the EGR valve 42. The relationship between the actual flowrate and the reference flowrate may vary depending on the opening degree of the EGR valve 42. Learning the relationship between the actual flowrate and the reference flowrate by using different opening degrees can learn this relationship appropriately in accordance with the opening degree of the EGR valve 42. It is thus possible to control the opening degree of the EGR valve 42 more appropriately by reflecting a decrease in the flowrate of the EGR gas caused by deposit, such as soot, attached to the EGR valve 42.

In the intake and exhaust system 1 according to the first embodiment, it may be desirable that the control device 50 change the reference flowrate in accordance with the opening degree of the EGR valve 42. Changing the reference flowrate means changing the set value of the reference flowrate. Accordingly, a value approximating to the expected value of the flowrate of air passing through the EGR valve 42 which is free from deposit, such as soot, can be set as the reference flowrate. The relationship between the actual flowrate and the reference flowrate can thus be appropriately learned. For example, changing the reference flowrate in accordance with the opening degree of the EGR valve 42 in learning processing makes it possible to appropriately learn the relationship between the actual flowrate and the reference flowrate for each of multiple opening degrees of the EGR valve 42.

Second Embodiment

An intake and exhaust system 1A according to a second embodiment of the disclosure will be described below with reference to FIGS. 7 through 10.

(Configuration)

The configuration of the intake and exhaust system 1A will be described below with reference to FIG. 7.

Figure 7:
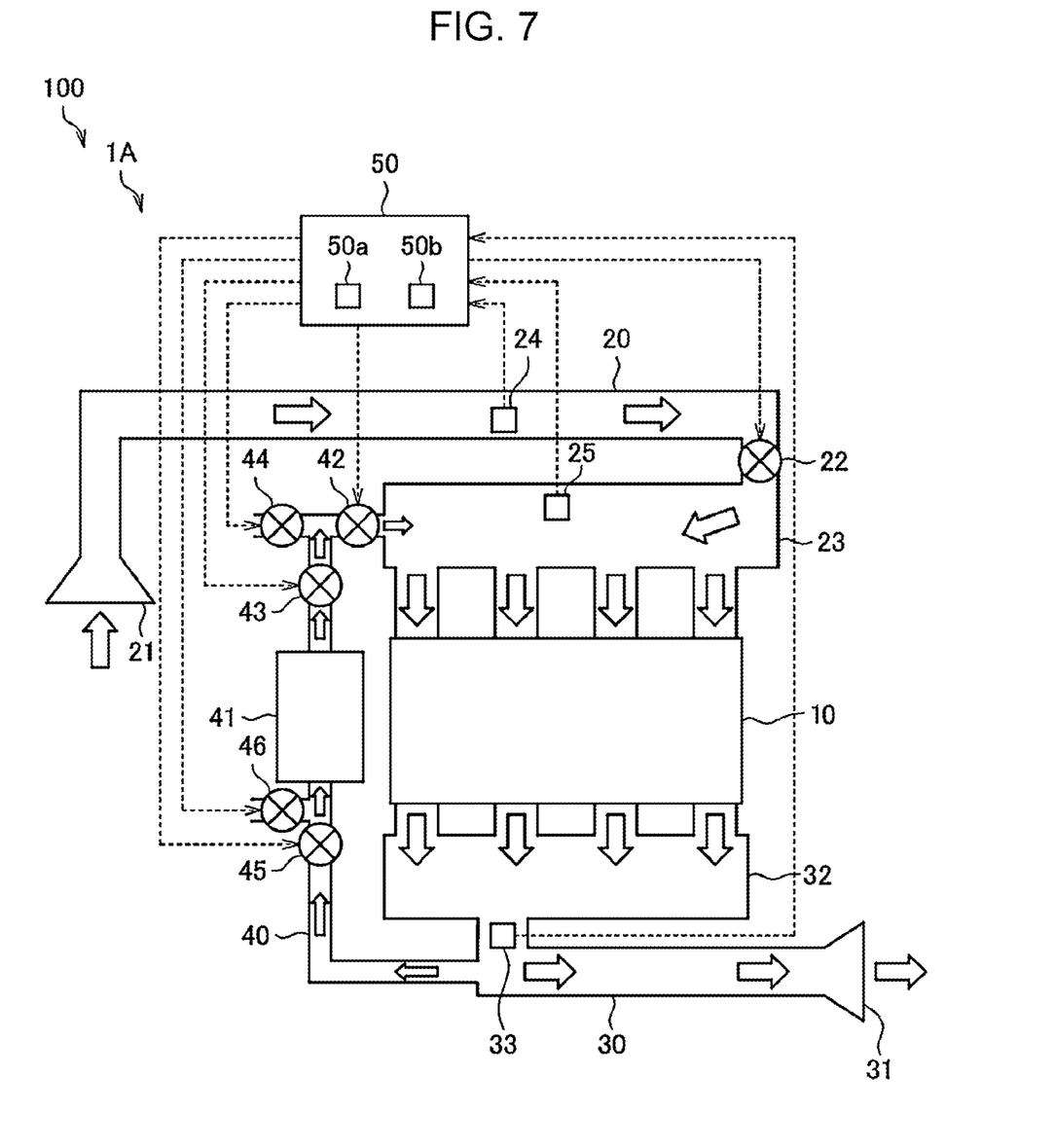
FIG. 7 is a schematic view illustrating the overall configuration of an intake and exhaust system according to an embodiment of the disclosure.

FIG. 7 is a schematic view illustrating the overall configuration of the intake and exhaust system 1A. The intake and exhaust system 1A is installed in the vehicle 100, as in the intake and exhaust system 1 of the first embodiment. The intake and exhaust system 1A is different from the intake and exhaust system 1 in that an isolation valve 45 and an air admittance valve 46 are also disposed in the EGR channel 40.

The isolation valve 45 may serve as an example of a second isolation valve according to an embodiment of the disclosure. The air admittance valve 46 may serve as an example of a second air admittance valve according to an embodiment of the disclosure.

The isolation valve 45 is disposed in the EGR channel 40 at a position closer to the exhaust gas channel 30 than the EGR cooler 41 is. As in the isolation valve 43, the isolation valve 45 can open and close the exhaust gas channel 30. When the isolation valve 45 is opened, the EGR gas coming from the exhaust gas channel 30 can pass through the isolation valve 45. When the isolation valve 45 is closed, the EGR gas coming from the exhaust gas channel 30 is unable to pass through the isolation valve 45.

The air admittance valve 46 is disposed in the EGR channel 40 at a position closer to the exhaust gas channel 30 than the EGR cooler 41 is and closer to the intake air channel 20 than the isolation valve 45 is. As in the air admittance valve 44, the air admittance valve 46 allows air to enter the EGR channel 40. For example, the air admittance valve 46 can open and close a branching channel which branches off from a portion of the EGR channel 40 closer to the exhaust gas channel 30 than the EGR cooler 41 is and which opens to the atmosphere. When the air admittance valve 46 is opened, air outside the EGR channel 40 can pass through the air admittance valve 46 and enter the EGR channel 40 via the air admittance valve 46. When the air admittance valve 46 is closed, air outside the EGR channel 40 is unable to pass through the air admittance valve 46 and does not enter the EGR channel 40 via the air admittance valve 46.

In the intake and exhaust system 1A, the controller 52 of the control device 50 controls the operations of the isolation valve 45 and the air admittance valve 46 as well as the operations of the throttle valve 22, the EGR valve 42, the isolation valve 43, and the air admittance valve 44.

(Operation)

The operation of the intake and exhaust system 1A will be described below with reference to FIGS. 8 through 10.

In the second embodiment, the control device 50 executes EGR control processing similarly to the first embodiment. The procedure of EGR control processing is similar to that illustrated in FIG. 3. Unlike in the first embodiment, however, the control device 50 executes second learning processing in addition to the first learning processing in the second embodiment.

Figure 8:
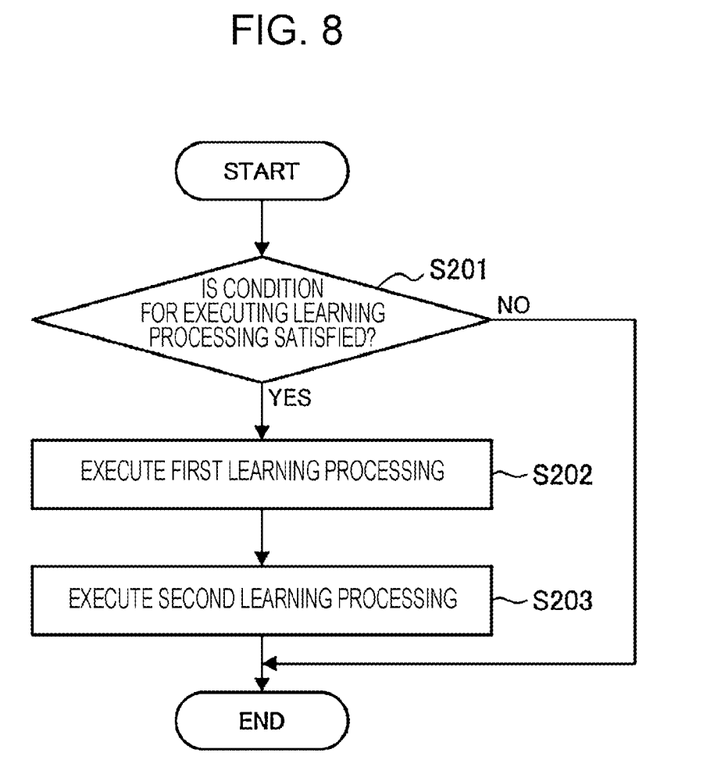
FIG. 8 is a flowchart illustrating an example of a procedure of learning processing executed by the control device in the embodiment.

FIG. 8 is a flowchart illustrating an example of a procedure of learning processing executed by the control device 50 in the second embodiment. Learning processing illustrated in FIG. 8 is repeatedly executed with EGR control processing illustrated in FIG. 3 in parallel or sequentially, for example.

The procedure of learning processing in FIG. 8 is different from that in FIG. 4 in that step S203 is added subsequent to step S202. For example, in the procedure of learning processing in FIG. 8, in step S202, the controller 52 executes the first learning processing, as in the procedure of the learning processing in FIG. 4. The procedure of the first learning processing in FIG. 8 is similar to that in FIG. 5. Then, in step S203, the controller 52 executes second learning processing and the procedure in FIG. 8 is completed.

Figure 9:
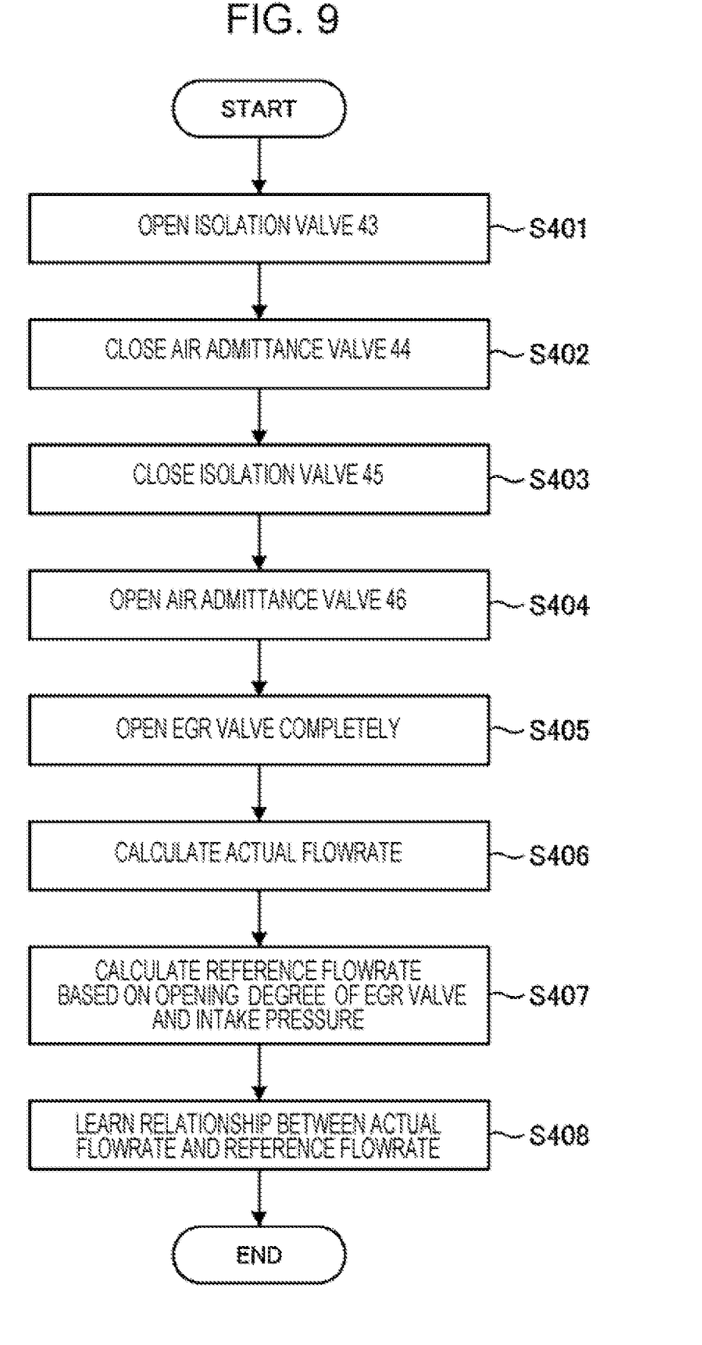
FIG. 9 is a flowchart illustrating an example of a procedure of second learning processing executed by the control device in the embodiment.

FIG. 9 is a flowchart illustrating an example of the procedure of the second learning processing executed by the control device 50 in the second embodiment. The procedure illustrated in FIG. 9 is executed in step S203 in the flowchart of FIG. 8.

In the second learning processing in FIG. 9, in step S401, the controller 52 first opens the isolation valve 43. This allows the EGR gas coming from the exhaust gas channel 30 to pass through the isolation valve 43.

Then, in step S402, the controller 52 closes the air admittance valve 44. This stops air outside the EGR channel 40 from passing through the air admittance valve 44 and entering the EGR channel 40 via the air admittance valve 44.

Then, in step S403, the controller 52 closes the isolation valve 45. This stops the EGR gas coming from the exhaust gas channel 30 from passing through the isolation valve 45.

Then, in step S404, the controller 52 opens the air admittance valve 46. This allows air outside the EGR channel 40 to pass through the air admittance valve 46 and to enter the EGR channel 40 via the air admittance valve 46.

Figure 10:
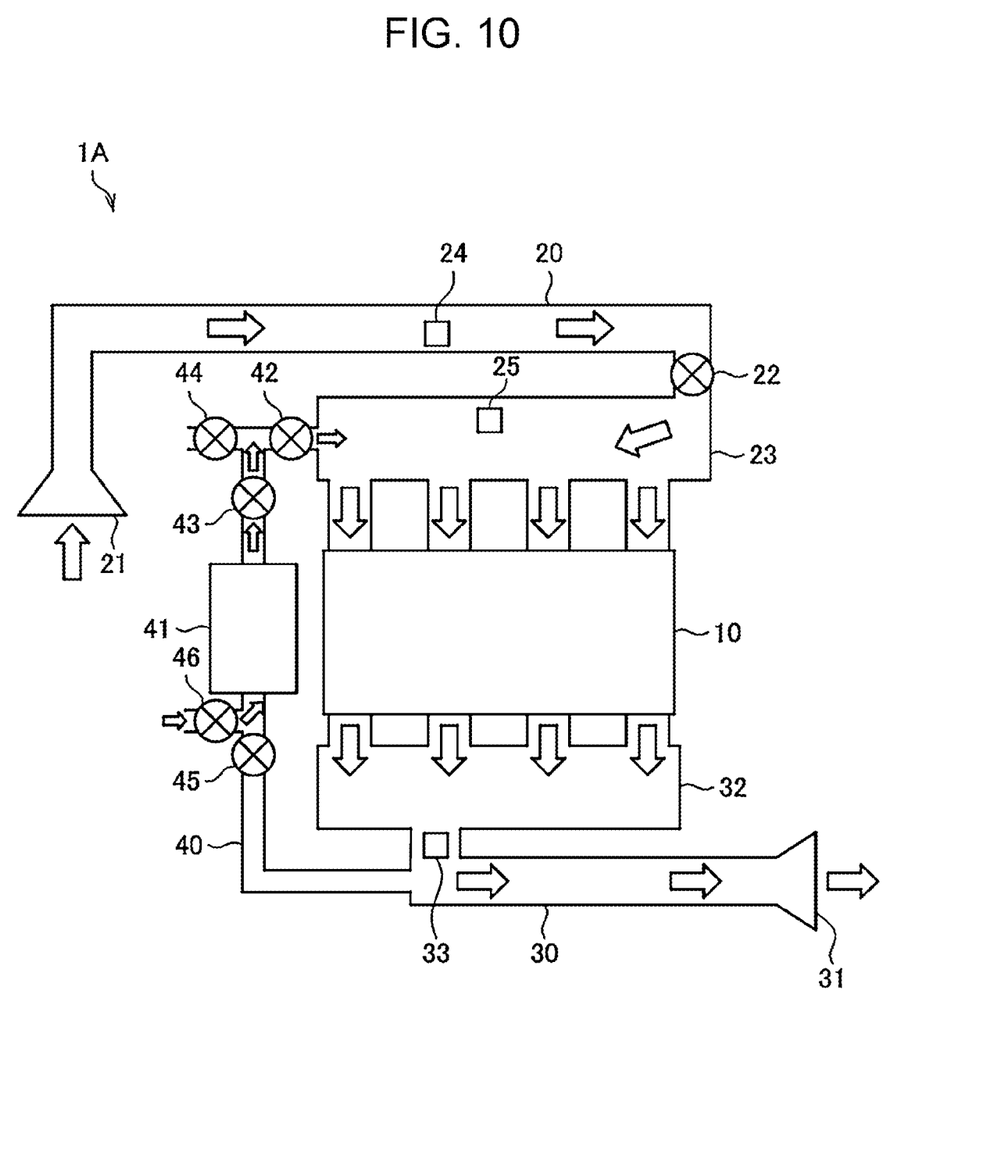
FIG. 10 is a schematic view for explaining a gas flow during second learning processing in the intake and exhaust system according to the embodiment.

FIG. 10 is a schematic view for explaining a gas flow during the second learning processing in the intake and exhaust system 1A. As described above, in the second learning processing, the intake and exhaust system 1A enters a second state in which the isolation valve 43 is opened and the isolation valve 45 is closed and the air admittance valve 44 is closed and the air admittance valve 46 is opened. In the second state, air is drawn to the EGR channel 40 via the air admittance valve 46, as indicated by the white arrows in FIG. 10. At this time, the intake manifold 23 is in a negative pressure state. Air having entered the EGR channel 40 via the air admittance valve 46 thus passes through the EGR cooler 41 and the EGR valve 42 and is supplied to the intake manifold 23.

Referring back to FIG. 9, in step S405, the controller 52 completely opens the EGR valve 42. That is, the controller 52 sets the opening degree of the EGR valve 42 to the largest angle.

Then, in step S406, the controller 52 calculates the actual flowrate, which is the flowrate of air actually passing through the EGR valve 42. The actual flowrate can be calculated similarly to that in step S304 in FIG. 5.

In step S407, the controller 52 calculates the reference flowrate, which is the reference value of the flowrate of air passing through the EGR valve 42, based on the opening degree of the EGR valve 42 and the intake pressure. The reference flowrate can be calculated similarly to that in step S305 in FIG. 5.

Then, in step S408, the controller 52 learns the relationship between the actual flowrate calculated in step S406 and the reference flowrate calculated in step S407. The second learning processing in FIG. 9 is then completed. The controller 52 stores the learned relationship between the actual flowrate and the reference flowrate in the memory 50b of the control device 50, for example. The relationship between the actual flowrate and the reference flowrate can be learned similarly to that in step S306 in FIG. 5. In the first learning processing, the relationship between the actual flowrate and the reference flowrate is learned for each of the different opening degrees of the EGR valve 42, as described above. In contrast, in the second learning processing, the relationship between the actual flowrate and the reference flowrate is learned only for a single opening degree. For example, the relationship between the actual flowrate and the reference flowrate in a state in which the EGR valve 42 is fully opened is learned.

As stated above, in the second embodiment, the control device 50 executes the second learning processing as well as the first learning processing. In the first learning processing, air to pass through the EGR valve 42 does not pass through the EGR cooler 41. In the first learning processing, the influence of the state of the EGR cooler 41 on the relationship between the actual flowrate and the reference flowrate is decreased, and then, the relationship between the actual flowrate and the reference flowrate is learned. In contrast, in the second learning processing, air to pass through the EGR valve 42 also passes through the EGR cooler 41. In the second learning processing, while learning the relationship between the actual flowrate and the reference flowrate, the controller 52 can also learn the influence of the state of the EGR cooler 41 on the flowrate of air passing through the EGR valve 42.

Deposit, such as soot, attached to the EGR cooler 41 may decrease the cross-sectional area of the EGR cooler 41 and accordingly reduce the flowrate of the EGR gas. In the second learning processing, it is possible to learn how much the flowrate of air passing through the EGR valve 42 is decreased due to deposit, such as soot, attached to the EGR cooler 41. In the processing example in FIG. 9, the second learning processing is executed in the state in which the EGR valve 42 is fully opened. When the EGR valve 42 is wide open, the flowrate of air passing through the EGR valve 42 is less likely to be influenced by deposit, such as soot, attached to the EGR valve 42. It is thus possible to highly accurately learn how much the flowrate of air passing through the EGR valve 42 is decreased due to deposit, such as soot, attached to the EGR cooler 41.

The control device 50 executes EGR control processing based on the results of learning processing, as discussed above. That is, the control device 50 executes EGR control processing based on the results of the second learning processing in addition to those of the first learning processing. It is thus possible to control the opening degree of the EGR valve 42 by also reflecting a decrease in the flowrate of the EGR gas caused by deposit, such as soot, attached to the EGR cooler 41.

For example, in the second embodiment, the controller 52 first determines the reference value of the target opening degree of the EGR valve 42 in step S103 in FIG. 3, based on various parameters obtained in step S101. Then, the controller 52 divides the determined reference value of the target opening degree by the ratio of the actual flowrate to the reference flowrate, which is an example of the relationship between the actual flowrate and the reference flowrate learned in the first learning processing, and then divides the resulting value by the ratio of the actual flowrate to the reference flowrate, which is an example of the relationship between the actual flowrate and the reference flowrate learned in the second learning processing. The controller 52 then sets the resulting opening degree to be the final target opening degree. Hence, the controller 52 can set a wider opening degree of the EGR valve 42 in accordance with a decrease in the flowrate of the EGR gas caused by deposit, such as soot, attached to the EGR valve 42 and also a decrease in the flowrate of the EGR gas caused by deposit, such as soot, attached to the EGR cooler 41. It is thus possible to obtain the flowrate of the EGR gas at which reduced NOx emissions and improved fuel efficiency can be implemented more appropriately.

As discussed above, according to the second embodiment, in EGR control processing, a decrease in the flowrate of the EGR gas caused by deposit, such as soot, attached to the EGR valve 42 and also a decrease in the flowrate of the EGR gas caused by deposit, such as soot, attached to the EGR cooler 41 can be reflected in determining of the opening degree of the EGR valve 42. The flowrate of the EGR gas can thus be suitably controlled even with the presence of deposit, such as soot, attached to the EGR valve 42. As a result, various factors of the intake and exhaust system 1A can be controlled more appropriately, for example, it is less likely to lower the fuel efficiency, increase NOx emissions, and degrade the knocking preventing performance.

(Advantages)

Advantages of the intake and exhaust system 1A will be described below.

In the intake and exhaust system 1A according to the second embodiment, the isolation valve 45 is also disposed in the EGR channel 40 at a position closer to the exhaust gas channel 30 than the EGR cooler 41 is, and the air admittance valve 46 is also disposed in the EGR channel 40 at a position closer to the exhaust gas channel 30 than the EGR cooler 41 is and closer to the intake air channel 20 than the isolation valve 45 is. In addition to the first learning processing, the control device 50 executes the second learning processing to learn the relationship between the actual flowrate and the reference flowrate in the second state in which the isolation valve 43 is opened and the isolation valve 45 is closed and the air admittance valve 44 is closed and the air admittance valve 46 is opened. In EGR control processing, the control device 50 can control the opening degree of the EGR valve 42 by reflecting a decrease in the flowrate of the EGR gas caused by deposit, such as soot, attached to the EGR valve 42 and also reflecting a decrease in the flowrate of the EGR gas caused by deposit, such as soot, attached to the EGR cooler 41. It is thus possible to control the flowrate of the EGR gas more suitably even with the presence of deposit, such as soot, attached to the EGR valve 42. As a result, various factors of the intake and exhaust system 1A can be controlled more appropriately. For example, it is less likely to lower the fuel efficiency, increase NOx emissions, and degrade the knocking preventing performance.

The disclosure has been discussed through illustration of the embodiments with reference to the accompanying drawings. However, the disclosure is not restricted to the embodiments. Obviously, many modifications and variations will be apparent to practitioners skilled in the art without departing from the scope and spirit of the disclosure and it is understood that such modifications and variations are also encompassed in the technical scope of the disclosure.

For example, processing operations discussed with reference to the flowcharts in the specification may not necessarily be executed in the order of the flowcharts. Another step may be added to the flowcharts and some steps may be removed from the flowcharts.

The control device 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 50 including the processor 50a and the memory 50b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An intake and exhaust system comprising:
   an engine;
   an intake air channel coupled to the engine;
   an exhaust gas channel coupled to the engine;
   an exhaust gas recirculation channel coupling the exhaust gas channel and the intake air channel to each other;
   an exhaust gas recirculation valve disposed in the exhaust gas recirculation channel; and
   a control device configured to execute exhaust gas recirculation control processing by adjusting an opening degree of the exhaust gas recirculation valve, the exhaust gas recirculation control processing being processing to control a flowrate of an exhaust gas which is to recirculate back to the intake air channel from the exhaust gas channel via the exhaust gas recirculation channel,
   wherein at least one isolation valve is disposed in the exhaust gas recirculation channel at a position closer to the exhaust gas channel than the exhaust gas recirculation valve is,
   wherein at least one air admittance valve is disposed in the exhaust gas recirculation channel at a position closer to the exhaust gas channel than the exhaust gas recirculation valve is and closer to the intake air channel than the at least one isolation valve is, wherein the control device is configured to execute learning processing to learn a relationship between an actual flowrate and a reference flowrate, the actual flowrate being a flowrate of air which is to actually pass through the exhaust gas recirculation valve in a state in which the at least one isolation valve is closed and the at least one air admittance valve is opened, the reference flowrate being a reference value of a flowrate of air which is to pass through the exhaust gas recirculation valve in the state, and wherein the control device is configured to execute the exhaust gas recirculation control processing based on a result of the learning processing.

2. The intake and exhaust system according to claim 1, wherein the control device is configured to learn, in the learning processing, the relationship between the actual flowrate and the reference flowrate for each of different opening degrees of the exhaust gas recirculation valve.

3. The intake and exhaust system according to claim 1, wherein the control device is configured to change the reference flowrate in accordance with the opening degree of the exhaust gas recirculation valve.

4. The intake and exhaust system according to claim 2, wherein the control device is configured to change the reference flowrate in accordance with the opening degree of the exhaust gas recirculation valve.

5. The intake and exhaust system according to claim 1, wherein:
an exhaust gas recirculation cooler is disposed in the exhaust gas recirculation channel at a position closer to the exhaust gas channel than the exhaust gas recirculation valve is;
in the exhaust gas recirculation channel, a first isolation valve is disposed as the at least one isolation valve at a position closer to the exhaust gas channel than the exhaust gas recirculation valve is and closer to the intake air channel than the exhaust gas recirculation cooler is;
in the exhaust gas recirculation channel, a first air admittance valve is disposed as the at least one air admittance valve at a position closer to the exhaust gas channel than the exhaust gas recirculation valve is and closer to the intake air channel than the first isolation valve is; and
the control device is configured to execute, as the learning processing, first learning processing to learn the relationship between the actual flowrate and the reference flowrate in a first state in which the first isolation valve is closed and the first air admittance valve is opened.

6. The intake and exhaust system according to claim 2, wherein:
an exhaust gas recirculation cooler is disposed in the exhaust gas recirculation channel at a position closer to the exhaust gas channel than the exhaust gas recirculation valve is;
in the exhaust gas recirculation channel, a first isolation valve is disposed as the at least one isolation valve at a position closer to the exhaust gas channel than the exhaust gas recirculation valve is and closer to the intake air channel than the exhaust gas recirculation cooler is;
in the exhaust gas recirculation channel, a first air admittance valve is disposed as the at least one air admittance valve at a position closer to the exhaust gas channel than the exhaust gas recirculation valve is and closer to the intake air channel than the first isolation valve is; and the control device is configured to execute, as the learning processing, first learning processing to learn the relationship between the actual flowrate and the reference flowrate in a first state in which the first isolation valve is closed and the first air admittance valve is opened.

7. The intake and exhaust system according to claim 3, wherein:
an exhaust gas recirculation cooler is disposed in the exhaust gas recirculation channel at a position closer to the exhaust gas channel than the exhaust gas recirculation valve is;
in the exhaust gas recirculation channel, a first isolation valve is disposed as the at least one isolation valve at a position closer to the exhaust gas channel than the exhaust gas recirculation valve is and closer to the intake air channel than the exhaust gas recirculation cooler is;
in the exhaust gas recirculation channel, a first air admittance valve is disposed as the at least one air admittance valve at a position closer to the exhaust gas channel than the exhaust gas recirculation valve is and closer to the intake air channel than the first isolation valve is; and
the control device is configured to execute, as the learning processing, first learning processing to learn the relationship between the actual flowrate and the reference flowrate in a first state in which the first isolation valve is closed and the first air admittance valve is opened.

8. The intake and exhaust system according to claim 4, wherein:
an exhaust gas recirculation cooler is disposed in the exhaust gas recirculation channel at a position closer to the exhaust gas channel than the exhaust gas recirculation valve is;
in the exhaust gas recirculation channel, a first isolation valve is disposed as the at least one isolation valve at a position closer to the exhaust gas channel than the exhaust gas recirculation valve is and closer to the intake air channel than the exhaust gas recirculation cooler is;
in the exhaust gas recirculation channel, a first air admittance valve is disposed as the at least one air admittance valve at a position closer to the exhaust gas channel than the exhaust gas recirculation valve is and closer to the intake air channel than the first isolation valve is; and
the control device is configured to execute, as the learning processing, first learning processing to learn the relationship between the actual flowrate and the reference flowrate in a first state in which the first isolation valve is closed and the first air admittance valve is opened.

9. The intake and exhaust system according to claim 5, wherein:
in the exhaust gas recirculation channel, a second isolation valve is disposed as the at least one isolation valve at a position closer to the exhaust gas channel than the exhaust gas recirculation cooler is;
in the exhaust gas recirculation channel, a second air admittance valve is disposed as the at least one air admittance valve at a position closer to the exhaust gas channel than the exhaust gas recirculation cooler is and closer to the intake air channel than the second isolation valve is; and
the control device is configured to execute, as the learning processing, second learning processing in addition to the first learning processing, the second learning processing being processing to learn the relationship between the actual flowrate and the reference flowrate in a second state in which the first isolation valve is opened and the second isolation valve is closed and the first air admittance valve is closed and the second air admittance valve is opened.

10. The intake and exhaust system according to claim 6, wherein:
- in the exhaust gas recirculation channel, a second isolation valve is disposed as the at least one isolation valve at a position closer to the exhaust gas channel than the exhaust gas recirculation cooler is;
- in the exhaust gas recirculation channel, a second air admittance valve is disposed as the at least one air admittance valve at a position closer to the exhaust gas channel than the exhaust gas recirculation cooler is and closer to the intake air channel than the second isolation valve is; and
- the control device is configured to execute, as the learning processing, second learning processing in addition to the first learning processing, the second learning processing being processing to learn the relationship between the actual flowrate and the reference flowrate in a second state in which the first isolation valve is opened and the second isolation valve is closed and the first air admittance valve is closed and the second air admittance valve is opened.

11. The intake and exhaust system according to claim 7, wherein:
- in the exhaust gas recirculation channel, a second isolation valve is disposed as the at least one isolation valve at a position closer to the exhaust gas channel than the exhaust gas recirculation cooler is;
- in the exhaust gas recirculation channel, a second air admittance valve is disposed as the at least one air admittance valve at a position closer to the exhaust gas channel than the exhaust gas recirculation cooler is and closer to the intake air channel than the second isolation valve is; and
- the control device is configured to execute, as the learning processing, second learning processing in addition to the first learning processing, the second learning processing being processing to learn the relationship between the actual flowrate and the reference flowrate in a second state in which the first isolation valve is opened and the second isolation valve is closed and the first air admittance valve is closed and the second air admittance valve is opened.

12. The intake and exhaust system according to claim 8, wherein:
- in the exhaust gas recirculation channel, a second isolation valve is disposed as the at least one isolation valve at a position closer to the exhaust gas channel than the exhaust gas recirculation cooler is;
- in the exhaust gas recirculation channel, a second air admittance valve is disposed as the at least one air admittance valve at a position closer to the exhaust gas channel than the exhaust gas recirculation cooler is and closer to the intake air channel than the second isolation valve is; and
- the control device is configured to execute, as the learning processing, second learning processing in addition to the first learning processing, the second learning processing being processing to learn the relationship between the actual flowrate and the reference flowrate in a second state in which the first isolation valve is opened and the second isolation valve is closed and the first air admittance valve is closed and the second air admittance valve is opened.

\* \* \* \* \*